United States Patent [19]

Markin et al.

[11] 4,212,933
[45] Jul. 15, 1980

[54] CURRENT COLLECTOR FOR ELECTROCHEMICAL CELLS AND METHOD OF MAKING

[75] Inventors: Trevor L. Markin, Goring-on-Thames; Roger J. Bones, Abingdon, both of England; Keith R. Linger, Sarnia, Canada; Peter J. Bindin, Runcorn, England; Michael P. J. Brennan, Helsby, via Warrington, England; Geoffrey J. May, Frodsham, England

[73] Assignee: Chloride Silent Power Limited, London, England

[21] Appl. No.: 908,438

[22] Filed: May 22, 1978

[30] Foreign Application Priority Data

Mar. 23, 1977 [GB] United Kingdom ............... 21709/77

[51] Int. Cl.² .................................................. H01M 6/00
[52] U.S. Cl. .................................... 429/122; 429/104; 427/34; 427/35; 427/122
[58] Field of Search ....................... 429/122, 101–104; 427/34, 35, 37, 122, 295; 204/173

[56] References Cited

U.S. PATENT DOCUMENTS

| 3,177,094 | 4/1965 | Dijksterhuis et al. | ........... 427/122 X |
| 3,658,572 | 4/1972 | Chu | ........ 427/34 |
| 3,970,768 | 7/1976 | Wilcox et al. | ................... 427/122 X |
| 4,103,042 | 7/1978 | Winters | ............................ 427/122 X |
| 4,142,008 | 2/1979 | DeBolt | ............................ 427/122 X |

Primary Examiner—Charles F. LeFevour
Attorney, Agent, or Firm—Beverige, DeGrandi, Kline & Lunsford

[57] ABSTRACT

A cathode current collector for a sodium sulphur cell is formed of a metal substrate, for example of a nickel alloy such as Inconel 600, which is provided with a firmly adherent coating of carbon which is produced by decomposition of a carbon-containing gas in a glow discharge with the substrate heated to a temperature of 200° C. to 1000° C. in an electric field, conveniently a radio frequency field employed for inductively heating the substrate.

21 Claims, 1 Drawing Figure

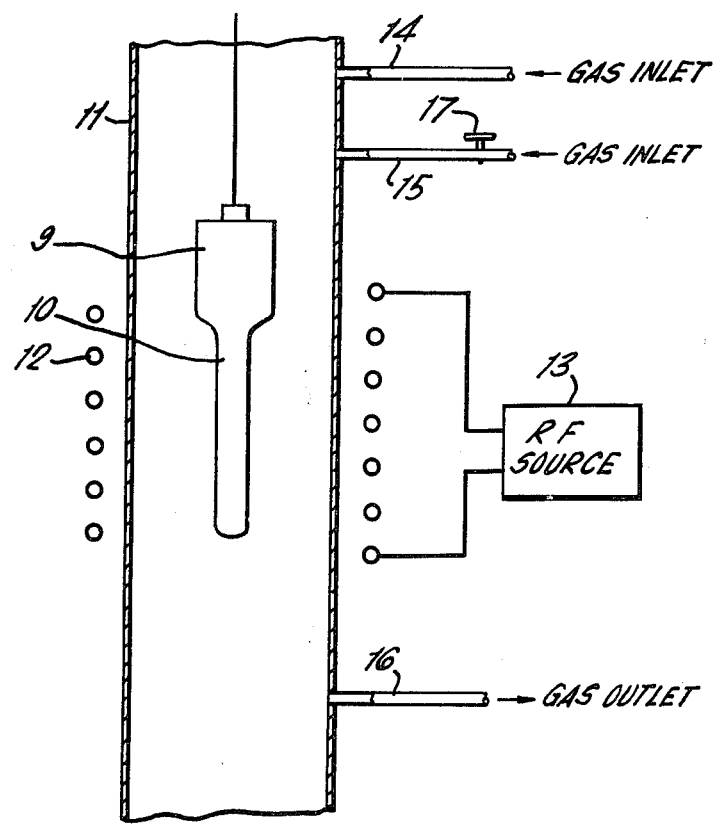

CURRENT COLLECTOR FOR ELECTROCHEMICAL CELLS AND METHOD OF MAKING

BACKGROUND OF THE INVENTION

1. Field of the Invention

This invention relates to sodium sulphur cells and is concerned more particularly with the cathode current collector in such a cell.

In a sodium sulphur cell a solid electrolyte, for example a beta-alumina ceramic, separates an anodic region containing sodium, which is liquid at the operating temperature of the cell, from a cathodic region which, at the operating temperature, contains liquid sulphur and sodium polysulphides. During discharge of the cell sodium ions pass through the electrolyte forming sodium polysulphides. The cathodic reactant comprising the sulphur and polysulphides has a high electrical resistance and it is the practice to put a matrix packing of conductive material, for example carbon or graphite felt, in the cathodic region to provide electronic conduction. Such graphite felt in itself has a relatively high resistance and it is desirable to keep the electronic current path through this material to the minimum length. For that reason, this matrix material is arranged to extend between the surface of the electrolyte material and an adjacent surface of a current collector. In a cell design where the sulphur is contained inside a tube of electrolyte material, this current collector may be a rod or composite rod disposed axially inside the electrolyte tube. The current collector rod has to provide a high conductivity path between the matrix packing material and an external terminal of the cell. It must, however, be chemically and electrochemically inert to the cathodic reactant material. Metals, such as aluminium and copper, are sufficiently conductive, but aluminium is passivated and copper is corroded after a few charge and discharge cycles of the cell. Stainless steel, which is much less conductive than aluminium or copper, is also corroded after a few charge/discharge cycles. For various reasons such corrosion causes a deterioration of cell characteristic. The mechanism of the deterioration is not completely understood and is probably different for each material. Certain nickel based alloys, in particular Inconel (a nickel alloy containing some 13% Cr 6% Fe by weight together with minor constituents), have longer lives.

2. Prior Art

For this reason carbon, particularly in its graphitic form, has been used as a current collector in many laboratory cells. Carbon in itself, however, is not sufficiently conductive to be used alone in long cells, which are operated at useful rates of charge and discharge. Other materials, which are thermodynamically stable in sulphur and polysulphides to the anode and cathode conditions that prevail in a sodium sulphur cell, have been proposed. A ceramic formed of oxides, such as tantalum or niobium doped rutile, is an example of such a thermodynamically stable material that can be used. Nickel oxide doped with lithium oxide and lanthanium strontium cobaltite may be used. Conductive ceramics are described in British Patent Specification No. 1,471,914. However such materials are not sufficiently conductive to be used alone in large cells, which operate at useful rates of charge and discharge.

It has, therefore, been proposed to use composite current collectors. U.S. Pat. No. 3,982,959 describes the use, in a sodium sulphur cell, of a cathode current collector of rod-like form arranged axially inside a solid electrolyte tube containing the cathodic reactant and packing material, this current collector comprising a carbon tube with a metal core. It is necessary to provide a deformable electronically-conductive interfere in the annular region between the carbon tube and the metal core in order to ensure good electrical contact across this region despite temperature cycling of the cell. Composites of this nature do raise manufacturing problems and it is difficult to construct such composites to have a useful life in a sodium sulphur cell. It would be preferable to have the corrosion-resistant material as a protective layer on a conductive substrate, which has other useful characteristics, such as being readily formed by drawing or rolling, readily weldable or having an expansion coefficient well matched to that of the ceramic electrolyte. Molybdenum is a corrosion-resistant material that is conductive but it is deficient in some of these useful properties mentioned above. It is sometimes convenient to use a protective coating of molybdenum on a substrate. It appears that molybdenum is corrosion-resistant in the cathodic reactant of a sodium sulphur cell because of the formation of a stable surface film of molybdenum disulphide, which is also electronically conductive.

Claims have been made for the efficacy of simple coatings of carbon carried out by the application of colloidal suspensions and of molybdenum coatings by the method of plasma spraying on substrates of steel, aluminium or iron-nickel-cobalt alloys, but those skilled in the art know that such coatings have only transitory efficacy in the cathode electrodes of the devices previously described. Plasma-sprayed molybdenum can be made to adhere to aluminium but the deposit is porous and the corroding species are able to penetrate through the porous layer to attack the substrate. In the case of a current collector formed by plasma spraying an aluminium rod with molybdenum, the resistance of a sodium sulphur cell containing such a current collector in the cathode increases enormously over about 20 charge/discharge cycles and is not therefore suitable for commercial cells.

It has also been suggested that a stable cell resistance can be achieved if a conductive substrate of aluminium is protected by a polyphenylene resin impregnated with carbon to confer the marginal conducting properties required in the corrosion-resistant sheath of the composite current collecting member. It is known, however, that the beneficial results of such a composite are much too transitory to find use in a practical energy conversion device.

BRIEF SUMMARY OF THE INVENTION

The present invention makes use, in forming a current collector, of a coating technique known as plasma activated vapour deposition (PAVD) in which a plasma is used as a medium for chemical reaction and deposition of an electronically-conductive coating on an electronically-conductive substrate. This technique makes use of the decomposition of a gas in an electrically-induced plasma, the substrate being connected as an electrode in a vessel containing an ionizable gas at a pressure such that a glow discharge can be generated in the vessel, the conditions of operation being controlled to tend to cause the positive region to be confined adjacent to the substrate thereby causing deposition on the substrate of an element or elements in combination from the ionizable gas. By this technique it has been found possible to obtain highly adherent and stable coatings of electrically-conductive materials onto a conductive substrate. Related techniques are disclosed in the paper "Codeposition of Glassy Silica and Germania inside a Tube by Plasma-Activated CVD" by D. Kuppers et al., Journal of the Electrochemical Society, Vol. 123 No. 7, pages 1079–82 July 1976.

Thus, considered broadly, according to this invention, there is provided a cathode current collector for a sodium-sulphur cell comprising a substrate of electrically-conductive material coated with carbon produced by decomposition of a carbon-containing gas in a glow discharge with the substrate heated to a temperature of 200° C.–1000° C. in an electric field.

The substrate may conveniently be of nickel or a nickel-containing metal alloy, e.g. a nickel-chromium-iron alloy such as Inconel 600. With some materials, e.g. aluminium, it is desirable to coat the substrate, e.g. with molybdenum, before applying the carbon.

The above-described current collector having a carbon coating deposited by a plasma activated vapour deposition (PAVD) process has been found to have unexpected mechanical integrity and durability even when the coating is applied to a substrate having a coefficient of thermal expansion differing widely from the coefficient of thermal expansion of the carbon coating material.

In considering current collectors and other components of an electrochemical cell having a PAVD deposited coating, it is convenient to consider individually the substrate material, the outer corrosion-resistant coating and, if provided, one or more intermediate layers separately. The substrate, in the case of a current collector would have to have the required electronic conductivity. For other components in the cell, the expansion coefficient may be important or the ease of fabrication. This substrate material can be chosen without consideration of corrosion-resistance and typical substrates might be aluminium, copper, steel and iron nickel cobalt alloys. As is well-known, by proper choice of the material or iron-nickel-cobalt alloys, it is possible to obtain controlled expansion coefficients and it is thus possible, by choice of the substrate material, to match the expansion coefficient to that of some other component, such as, for example ceramic electrolyte material. The outer layer is carbon, which is chosen primarily by consideration of corrosion-resistance.

As indicated above one or more intermediate layers may be required in certain cases. Such layers may be formed, for example, of nickel alloys such as Inconel 600 or nickel chromium alloys or chromium or molybdenum or chromium carbide or titanium carbide or silicon carbide. The choice of the intermediate layer will primarily be governed by the materials chosen for the substrate and the outer layer, the intermediate layer being a material which can be deposited on the substrate, or on an already deposited layer and which will receive the outer layer or a further intermediate layer.

As mentioned above, carbon is of primary interest for the outer corrosion-resistant layer in a sodium sulphur cell. It may be applied to a metal substrate and it has been found preferable to apply the carbon as a thin layer onto a smooth substrate of a metal having a coefficient of thermal expansion close to that of the carbon. Suitable materials in this respect are Nilo-K, molybdenum, titanium and tungsten. The substrate may be formed of one of these materials or such a material may be an intermediate layer formed as a coating on a substrate of a relatively inexpensive material such as mild steel. Metals such as molybdenum and tungsten have a particular advantage as a substrate or as an intermediate layer under a carbon coating in that they are passive to the cathodic reactant of a sodium sulphur cell in the event of a local breakdown of the carbon layer. The carbon is applied by a PAVD process as described above. The intermediate layer may be applied by a PAVD process or by an ion beam technique. Good coatings are also obtained on Inconel 600 although it has a relatively high coefficient of expansion.

The invention furthermore includes within its scope a method of making a cathode current collector for a sodium-sulphur cell comprising the steps of subjecting an electrically-conductive substrate to an electrical discharge in an atmosphere including a carbon-containing gas, the substrate being heated to a temperature of 200° C.–1000° C. and the atmosphere being such that carbon deposition occurs on the substrate because of decomposition of the carbon-containing gas. This carbon-containing gas is conveniently ethylene or carbon disulphide. An inert carrier gas, e.g. argon or krypton is preferably provided to promote formation of the glow discharge and to provide ions for ion bombardment of the article. This ion bombardment consists in the forming of an adherent coating.

BRIEF DESCRIPTION OF THE DRAWING

The accompanying drawing is a diagram illustrating one method of manufacture of a cathode current collector for a sodium sulphur cell.

DESCRIPTION OF THE PREFERRED EMBODIMENT

Referring to the drawing, the collector 10, e.g. of molybdenum, is of generally rod like form with an enlarged diameter part 9 near one end. This collector is suspended coaxially in a cylindrical silica or glass reaction vessel 11, typically having a diameter of 40 to 15 mm, which is arranged with its axis upright. The vessel 11 is surrounded by a helical water-cooled copper coil 12 which is coupled to a high frequency generator 13. The spacing between adjacent turns of the coil 12 is typically 15 mm, and the diameter of the coil is about 100 mm. The collector 10 is suspended so that only the narrow diameter portion lies within the coil as, in this particular construction, only this narrow diameter part is to be coated with carbon. The vessel 11 has controlled inlets 14,15 for reactant gases and an outlet 16 leading to a pump.

The reactor vessel 11 is evacuated to about 0.02 torr and then filled with an inert gas e.g. argon to 2.0 torr and the pressure maintained at that level by adjustment of a throttle valve 17 in the pumping line. The high frequency power is then applied to the coil 12 typically at 1.2 kV and a plasma sheath develops around the collector 10, which is coupled to earth (or may be biased negatively). After 15 to 30 minutes, when the collector 10 has reached thermal equilibrium and the surface thereof has been cleaned by bombardment with inert gas ions, the carbon containing reactant gas, e.g. ethylene, is let into the vessel 11, the pressure being adjusted and controlled to maintain a pressure of 2.0 to 2.5 torr. Carbon is now deposited on the collector; the coating time determines the thickness, the rate of deposition being constant. Typically 45 minutes would give 1 to 2 μm coating.

The reactant gas and the power are turned off, then the argon, and the system evacuated. The collector 10 then cools under vacuum. The temperature that it has reached is determined by the currents induced in the skin of the material by the high frequency. Factors affecting this temperature include the power to the coil, the dimensions of the coil and the collector, the material of the collector and the frequency applied.

The reactant gas for this example is ethylene, which is fed in at 30 ml min$^{-1}$, together with argon as the carrier inert gas which is fed in at 95 ml min$^{-1}$.

It has been found that with this technique, the collector is uniformly coated with a very fine carbon, which is essentially amorphous, having an extremely fine crystallite size, of low modulus and strongly adherent to the collector.

The following are two examples of test results obtained with sodium sulphur cells employing current collectors formed as described above.

EXAMPLE 1

A molybdenum rod current collector was coated with carbon by the plasma activated vapour deposition method described above. The current collector was employed in a cell in which the sulphur was contained inside a tubular solid ceramic electrolyte of beta-alumina with the sodium outside the electrolyte tube. This cell completed 135 cycles during 35 days at 100 mA cm$^{-2}$ discharge current density and 50 mA cm$^{-2}$ charge current density before electrolyte failure occurred. There was no rise in cell resistance during the 135 cycles and in this respect the cell shows a distinct advantage over similar cells run to date. The capacity remained at 76% of the theoretical based on the weight of sulphur in the electrode. Cells containing a molybdenum rod current collector without a carbon coating show a rapid loss of capacity with cycling.

EXAMPLE 2

As molybdenum is expensive, a current collector was made having a mild steel substrate with a thin film (25 μm) of molybdenum applied over its surface by a soft vacuum deposition method. The molybdenum layer was protected by a coating of carbon put down by the PAVD method described above. The cell embodying this current collector completed 220 cycles during 52 days (and continued to run) at 100 mA cm$^{-2}$ discharge and 50 mA cm$^{-2}$ charge current density. The capacity remains constant at 73% of theoretical based on the weight of sulphur in the electrode. The resistance of the cell has remained constant. The behaviour of the cell is, therefore, much akin to the cell in Example 1. Apart from the use of the cheaper substrate, the current collector is constructed in the same way. It has been found that PAVD carbon layers deposited onto smooth layers, such as result from vapour deposition methods, are better than coatings on a rougher surface, such as a surface resulting from plasma spraying.

If the current collector is long, it may be desirable to provide the mild steel with a core of a good electrically conducting material such as aluminium or copper.

It is convenient to use a radio frequency field so that the substrate is inductively heated. If alternative heating means are provided, there is no need to have a coil and thus the radio frequency power may be applied to two electrodes or between one electrode and the article to be coated. Instead of a radio frequency field, in this case a D.C. field may be employed. With a D.C. field, conveniently the article forms one electrode and the second electrode is in the form of a cylinder, conveniently of mesh material, inside the evacuated vessel. In some cases, the article may be arranged in the field between two electrodes. Using electrodes instead of a coil, it becomes readily possible to obtain more intense fields and the substrate may be heated by the electrical discharge.

We claim:

1. A cathode current collector for a sodium-sulphur cell, wherein said collector comprises an electrically conductive substrate having a surface selected from the group consisting of nickel, a nickel-containing alloy, molybdenum, titanium and tungsten, said substrate being coated with carbon, wherein the coated substrate is the product obtained by a process comprising contacting said substrate with a gas atmosphere comprising an inert gas and a carbon-containing gas and providing a glow discharge in an electric field sufficient to form ions of said inert gas and to bombard said substrate with said ions to thereby substantially clean said substrate, and contacting the resulting clean substrate with a plasma sheath of carbon produced by decomposition of said carbon-containing gas in a glow discharge with the substrate heated to a temperature of 200° C.-1000° C. in the presence of inert gas and in an electric field, wherein said clean substrate is enveloped by said plasma and carbon is deposited on said clean substrate to thereby form a highly adherent and stable coating of carbon on said substrate capable of withstanding conditions in a cathodic region of a sodium sulphur cell.

2. A cathode current collector as claimed in claim 1 wherein the substrate is a metal element with a coating of a nickel or a nickel-containing metal alloy.

3. A cathode current collector as claimed in claim 1 wherein the substrate is a metal element with a coating of a nickel-chromium-iron alloy.

4. A cathode current collector as claimed in claim 1 wherein the substrate is Inconel 600.

5. A method of making a cathode current collector for a sodium-sulphur cell, wherein said collector comprises an electrically conductive substrate having a surface selected from the group consisting of nickel, a nickel-containing alloy, molybdenum, titanium and tungsten, said substrate being coated with carbon, wherein said process comprises contacting said substrate with a gas atmosphere comprising an inert gas and a carbon-containing gas and providing a glow discharge in an electric field sufficient to form ions of said inert gas and to bombard said substrate with said ions to thereby substantially clean said substrate, and contacting the resulting clean substrate with a plasma sheath of carbon produced by decomposition of a carbon-containing gas in a glow discharge with the substrate heated to a temperature of 200° C.-1000° C. in the presence of inert gas and in an electric field, wherein said clean substrate is enveloped by said plasma and carbon is deposited on said clean substrate to thereby form a highly adherent and stable coating of carbon on said substrate capable of withstanding conditions in a cathodic region of a sodium sulphur cell.

6. A method as claimed in claim 5 wherein the temperature of the substrate is between 400° C. and 1000° C.

7. A method as claimed in claim 5 wherein the temperature of the substrate is between 400° C. and 600° C.

8. A method as claimed in claim 5 wherein the electric discharge is produced by a radio frequency field.

9. A method as claimed in claim 8 wherein the substrate is inductively heated by the radio frequency field.

10. A method as claimed in claim 5 wherein the electric discharge is produced by a direct voltage between an electrode around the substrate and the substrate or between two electrodes.

11. A method as claimed in claim 5 wherein said atmosphere includes an inert gas to promote the formation of a glow discharge.

12. A method as claimed in claim 11 wherein the inert gas is argon.

13. A method as claimed in claim 5 wherein the carbon-containing gas is ethylene or carbon disulphide.

14. A method as claimed in claim 12 wherein the carbon-containing gas is introduced after the arc has been struck in the argon.

15. A method as claimed in claim 5 wherein the pressure of said atmosphere is between 10 millitorr and 10 torr.

16. A method as claimed in claim 15 wherein the pressure is between 0.1 torr and 10 torr.

17. A method as claimed in claim 5 wherein the substrate is a nickel or a nickel-containing alloy.

18. A method as claimed in claim 5 wherein the substrate is a nickel-chromium-iron alloy.

19. A method as claimed in claim 5 wherein the substrate is Inconel 600.

20. A method as claimed in claim 5 wherein the substrate is a molybdenum-coated metal.

21. A cathode current collector for a sodium-sulphur cell, wherein said collector comprises an electrically conductive substrate having a surface selected from the group consisting of nickel, a nickel-containing alloy, molybdenum, titanium and tungsten, said substrate being coated with carbon, wherein the coated substrate is the product obtained by (A) contacting said substrate with an inert gas atmosphere and providing a glow discharge in an electric field sufficient to form ions of said inert gas and to bombard said substrate with said ions to thereby substantially clean said substrate, and (B) contacting the resulting clean substrate with a plasma sheath of carbon produced by decomposition of a carbon-containing gas in a glow discharge with the substrate heated to a temperature of 200° C.–1000° C. in the presence of an inert gas and in an electric field, wherein said clean substrate is enveloped by said plasma and carbon is deposited on said clean substrate to thereby form a highly adherent and stable coating of carbon on said substrate capable of withstanding conditions in a cathodic region of a sodium sulphur cell.

* * * * *

UNITED STATES PATENT AND TRADEMARK OFFICE
CERTIFICATE OF CORRECTION

PATENT NO. : 4,212,933
DATED : July 15, 1980
INVENTOR(S) : Trevor L. Markin et.al.

It is certified that error appears in the above-identified patent and that said Letters Patent are hereby corrected as shown below:

On the cover page, left hand column, after "Foreign Application Priority Data", delete "Mar." and substitute therefore --May--.

Signed and Sealed this

Twentieth Day of January 1981

[SEAL]

Attest:

RENE D. TEGTMEYER

Attesting Officer     Acting Commissioner of Patents and Trademarks